United States Patent [19]

Bernier et al.

[11] 4,251,582

[45] Feb. 17, 1981

[54] DYEABLE AND DYED POLYMER-COATED ARTICLES

[75] Inventors: Lornie J. Bernier, Guys Mills; Tapan K. Das, Meadville, both of Pa.

[73] Assignee: Textron Inc., Providence, R.I.

[21] Appl. No.: 39,242

[22] Filed: May 15, 1979

Related U.S. Application Data

[60] Division of Ser. No. 659,582, Feb. 19, 1976, Pat. No. 4,172,702, which is a continuation-in-part of Ser. No. 501,371, Aug. 28, 1974, Pat. No. 3,939,547.

[51] Int. Cl.³ ........................ B21D 53/50; B29D 5/00; D06P 5/00; B05D 1/06

[52] U.S. Cl. ........................................ 428/99; 427/27; 427/195; 427/202; 427/340; 427/409; 428/336; 428/339; 428/458; 428/460; 8/509; 8/512; 8/516; 8/520; 24/205 G; 148/6.16

[58] Field of Search .................. 428/99, 460, 334–336, 428/339, 458; 8/4, 173, 178 R; 427/195, 27, 202, 340, 409; 24/205 R, 205 G; 148/6.16, 6.15 R

[56] References Cited

U.S. PATENT DOCUMENTS

| | | | |
|---|---|---|---|
| 2,334,000 | 11/1943 | Hamm | 8/4 |
| 3,467,484 | 9/1969 | Hermes | 8/173 X |
| 3,558,260 | 1/1971 | Hermes | 8/173 X |
| 3,663,262 | 5/1972 | Cogan | 8/4 |
| 3,743,529 | 7/1973 | Ramsay | 427/195 |
| 3,771,949 | 11/1973 | Hermes | 8/4 |
| 3,836,327 | 9/1974 | Bartsch | 8/173 |
| 3,922,447 | 11/1975 | Isaksen | 427/195 X |
| 3,939,547 | 2/1976 | Bernier et al. | 427/195 |
| 4,046,505 | 9/1977 | Cobb et al. | 8/4 X |
| 4,050,892 | 9/1977 | Jilla | 8/4 |
| 4,137,043 | 1/1979 | Bernier et al. | 427/195 X |

*Primary Examiner*—Harold Ansher
*Attorney, Agent, or Firm*—O'Brien & Marks

[57] ABSTRACT

Dyeable and dyed polymer-coatings on metal articles such as sliders, buttons, buckles, clasps, nuts, bolts, hooks, etc. include a substantial quantity of active proton acceptor groups relative to the number of polymer molecules in order to provide adequate dye pick-up.

41 Claims, 9 Drawing Figures

FIG. 1
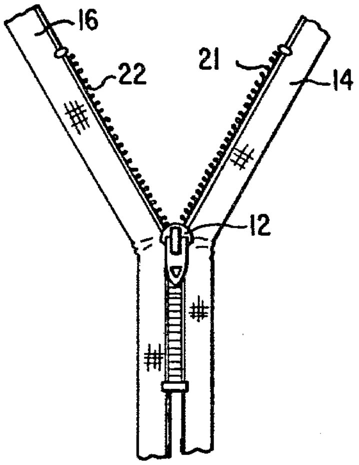
FIG. 2
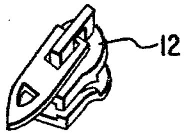
FIG. 3
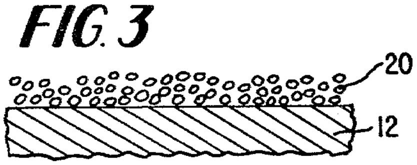
FIG. 4
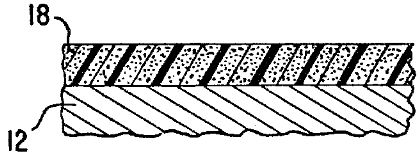
FIG. 5
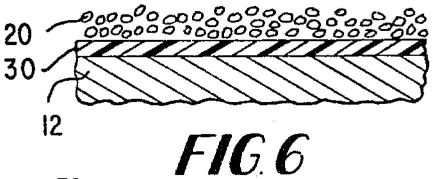
FIG. 6
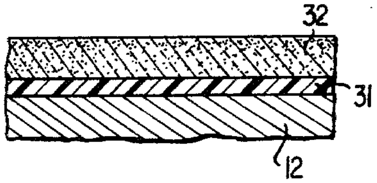
FIG. 9
FIG. 7
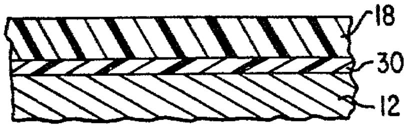
FIG. 8
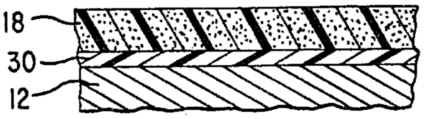

DYEABLE AND DYED POLYMER-COATED ARTICLES

CROSS REFERENCE TO RELATED APPLICATION

This application is a divisional application of U.S. application Ser. No. 659,582 filed Feb. 19, 1976, now U.S. Pat. No. 4,172,702. This parent application, Ser. No. 659,582, is a continuation-in-part application of U.S. application Ser. No. 501,371, filed Aug. 28, 1974, which is now U.S. Pat. No. 3,939,547 and is incorporated herein by reference. A divisional application, U.S. Ser. No. 636,265 filed Nov. 28, 1975, of the U.S. application Ser. No. 501,371 is now U.S. Pat. No. 4,137,043.

BACKGROUND OF THE INVENTION

1. Field of the Invention

The invention relates to dyeable and dyed polymer-coated metal articles and methods of producing dyeable and dyed polymer-coated metal articles.

2. Description of the Prior Art

The prior art, as exemplified in U.S. Pat. No. 2,042,451, No. 2,334,000, No. 2,535,794, No. 3,544,351, No. 3,615,894 and No. 3,647,567, includes a number of coatings and processes for producing various coatings including colored coatings, on metal articles. Presently in the manufacture of textile articles with metal fastener elements, such as slide fasteners with metal sliders, the elements are coated with liquid enamel paints which include pigments selected to produce coatings of the desired color when the paints dry or solidify, while the textile portions of the articles are dyed separately from the metal elements; then the enameled fastener elements are attached to the articles to produce completed color-coordinated articles. The separate enameling of the metal slider elements requires the maintenance of an inventory of numerous different colors and shades of slide fasteners and paints as well as complex general planning to coordinate the production activity of the fasteners; often purchasers of the slide fasteners, such as garment makers, request colors which are not in inventory; and supplying such non-inventoried fasteners introduces delays, interruptions, and/or inefficiency in the production activity.

The above U.S. Pat. No. 2,334,000 discloses a particular slide fastener and process wherein a metal slider is coated with a white enamel, assembled on white tapes, and then subjected to a dye process to form a colored slide fastener. There have also been previous attempts to form dyeable metal sliders by coating with a polymer; such coatings have been made from dry powder epoxy coatings and from nylon coatings, dry powder nylon coatings being well known in the prior art. The formation of a suitable dye coating on sliders and dyeing of the coating have generally not been commercially successful; the prior art coatings were unevenly dyed, did not readily pick up colors from dyes, or often resulted in colors from certain dyes which substantially differ from or conflict with the colors produced in the slide fastener tapes. Also, the prior art coatings could not withstand the acid mediums employed in many conventional dye processes, or easily chipped and peeled off and thus could not withstand the handling, such as tumble drying, normally given to garments.

The prior art contains a number of prior art processes utilizing baths, including electrostatically charged powder sprays, of powdered polymer resins, including epoxy resins and nylon resins, for producing polymer films or coatings on metal articles. U.S. Pat. No. 3,028,251, No. 3,058,951, No. 3,321,438, No. 3,442,856, No. 3,506,598, No. 3,102,823 and No. 3,758,633 disclose particular epoxy resins for coatings. The powder resins generally contain pigments, such as titanium dioxide and the like, for producing a coating of a desired color. Some of the polymer coatings, particularly the epoxy coatings, have been known for their adherence, durability and resistance to chemical attack. However, the required powder bath coating equipment and its limited suitability for being repeatedly and conveniently changed to produce different color coatings along with the higher cost of materials has prevented any extensive adoption of pigment colored powder bath coating color matching metal fastener elements for dyed articles.

Primer coatings such as the phenol formaldehyde coating disclosed in U.S. Pat. No. 3,697,331 have been used to increase the corrosion resistance and paint adhesion of metal articles.

Dyes in the prior art have been successfully utilized to color a variety of materials including fabrics and, as illustrated in U.S. Pat. No. 2,854,367, phosphate treated metal surfaces. The dyes have been divided into a number of general classes, such as acid dyes, direct dyes, disperse dyes, mordant dyes, fiber reactive dyes, basic dyes, azoic dyes, etc. according to their use or properties. Acid dyes are water-soluble anionic dyes that are applied to nitrogenous fibers such as wool, silk, nylon and modified acrylic fibers, from acid or neutral baths; attachment of color groups to the fiber is attributed at least partly to salt formation between anionic groups in the dyes and cationic groups in the fiber. Active amino groups exhibit a basic nature which has been attributed to their ability to attract and dissociate a proton from $H_2O$ thus forming a cationic group and a free hydroxyl ion. Direct dyes are also considered to be generally anionic in nature and substantive to cellulosic fibers in the presence of an electrolyte such as salt. Disperse dyes are substantially water-insoluble dyes held in aqueous solution by anionic dispersing agents. The disperse dyes are generally believed to migrate from the dispersion, sometimes with the aid of a carrier, into the fibers where the dyes remain due to their insolubility; in nylon fibers hydrogen bonds between amino groups in disperse dyes and carbonyl groups in the nylon fibers may contribute to fixation. Mordant dyes and azoic dyes generally require the reaction of two components in situ in the fiber to produce an insoluble molecule. In the dyeing of nylon rugs and carpets, benzyl alcohol is conventionally included in dye solutions to increase the dye pick-up in the nylon rugs and carpets. Although the prior dyeing art is extensive, the various properties of dyes and their application to various materials is not completely understood.

SUMMARY OF THE INVENTION

The invention is summarized in that an article of manufacture includes a metal member, and a dyeable polymer coating on the member, the polymer coating including a quantity of active proton acceptor groups at least equal to 0.5 times the quantity of molecules in the polymer coating to provide for dye pick-up in the polymer coating.

An object of the invention is to provide dyed and dyeable coatings on metal articles wherein a wide variety of colors may be produced by dyeing with respective dyes selected from a large number of suitable but different dyes.

Another object of the invention is to form colored coatings in metal elements which are closely matched with dyed articles.

Yet another object of the invention is to eliminate the necessity of maintaining inventories of a large number of different color articles and/or painting materials to form different color coatings on articles.

An advantage of the invention is that complex planning concerning the forming of different color coatings on metal fastener elements corresponding to different color garments is substantially reduced.

Other objects, advantages and features of the invention will become apparent from the following description taken in conjunction with the accompanying drawings.

BRIEF DESCRIPTION OF THE DRAWINGS

FIG. 1 is a plan view of a slide fastener including a metal slider which may be color coated in accordance with the invention.

FIG. 2 is a perspective view of the metal slider of FIG. 1.

FIG. 3 is a detailed cross-section view of a portion of the slider of FIG. 2 after one step in the coating process.

FIG. 4 is a view similar to FIG. 3 after a final step in the coating process.

FIG. 5 is a detailed cross-section of a portion of a slider after one step in a modified coating process.

FIG. 6 is a view similar to FIG. 5 after a further step in the modified coating process.

FIG. 7 is a view similar to FIGS. 5 and 6 after a still later step in the modified coating process.

FIG. 8 is a view similar to FIGS. 5, 6 and 7 after a still later step in the coating process.

FIG. 9 is a view similar to FIGS. 5, 6, 7 and 8 illustrating in detail a cross-sectional view of a slider in a modified coating process.

DESCRIPTION OF THE PREFERRED EMBODIMENT

An article, such as a slide fastener shown in FIG. 1 manufactured in accordance with the invention, has a metal element or member, such as a slider 12, with a colored coating matching the color of other portions of the article, such as textile stringer tapes 14 and 16. A dyeable polymer film 18, FIG. 4, is formed on the slider 12 by first coating with a powdered polymer resin 20, FIG. 3, and then heating the powdered resin to convert the coating 20 into the coherent film 18. The slider 12 is assembled on fastener elements 21 and 22 of the tapes 14 and 16 which are initially undyed. The article may include other undyed portions, such as a textile garment (not shown) having a seam opening to which the fastener is secured for opening and closing the seam. Then the entire article including the polymer coated metal slider 12 is subjected to a dyeing process, as indicated by the stipling in FIG. 4, to form a colored article which has the color of the polymer film 18 on the metal slider 12 matching the color of the rest of the article including the textile tapes 14 and 16.

In addition to the described slide fastener many other elements and members, such as buttons, buckles, clasps, snaps, nuts, bolts, hooks, other fasteners, furnishing, etc. can also be formed with dyeable polymer coatings. Where the dyeable metal members are to be color-coordinated or matched with other portions of an article, the members can be dyed separate from such other portions when such other portions are already colored or will not be suitably dyed by the same dye. Also the dyeable coatings can be applied by processes other than the described dry powdered coating process.

It has been discovered that certain polymer coatings, particularly polymer coatings containing a substantial quantity of active proton acceptor groups, result in substantially improved color pick-up when subjected to dye solutions. Metal members or articles having such polymer coatings when subjected to a dye process, will pick-up substantially more color from a dye than a polymer coating not having such a substantial quantity of available proton acceptor groups. Certain polymer coatings, such as coatings produced from nylon resins and from an epoxide resin and an amine, produce colors which closely match the colors produced in synthetic textile materials, such as those made from any of the common nylon fibers and the common polyester fibers, when dyed together.

The term "proton acceptor group" includes those basic acting radicals, such as the quaternizable derivatives of ammonia including the primary, secondary and tertiary amine groups, which are believed capable of attracting and dis-associating a proton from $H_2O$ to form a cationic group and a free hydroxyl ion. Amines form a covalent bond with a proton and thereby become "quaternized".

The polymer resin can be, for example, an epoxy resin, a nylon resin, or a copolymer resin containing a polyester or an acrylic resin. All of the resins when formed into a film must have a quantity of active or untransformed proton acceptor groups equal to at least 0.5 times the quantity of polymer resin molecules, irrespective of cross-linking and additive chain-linking during hardening, to produce acceptable dye pick-up. Preferrably the quantity of active proton acceptor groups is at least equal to the quantity of polymer resin molecules, and especially preferrably greater than 1.1 times the quantity of polymer resin molecules. Some resins such as the nylons contain active proton acceptor groups while other resins such as the epoxides, polyesters and acrylics often must contain other materials, such as cross-linking or curing agents or copolymers, with active proton acceptor groups.

There are several nylon resins commercially available and which can be dyed. Among the nylons, nylon-11, nylon-12, nylon-6, nylon-6,6 and copolymer nylon-6,6 and nylon-6,10 have been used in making film coatings utilizing a powder deposition process. Nylon-11 and nylon-12 have a greater differential between their melting temperature and their decomposition temperature and have been found to be favored for producing nylon coatings by powder coating processes.

Polyesters suitable for coating and dyeing include the condensation products of polycarboxylic acids and polyols and, in particular, aliphatic, aromatic and heterocyclic polycarboxylic acids and aliphatic, aromatic and heterocyclic polyols. More particularly, polyesters suitable for coatings and dyeing processes, in accordance with the invention include the condensation products in aliphatic, aromatic and heterocyclic dicarboxylic acids and aliphatic, aromatic and heterocyclic diols. Those deserving of special mention are the polyethylene terephthalates such as the condensation products of ethylene glycol with terephthalic acid or dimethyl terephthalate. Polyesters containing only hydroxyl and carboxyl groups can be made dyeable by including a curing agent, such as an amine, or an amine copolymer in the coating composition applied to the metal article to be dyed.

Also useful in the production of dyeable coatings on metal articles are the polymethacrylates and the polymethylmethacrylates. Such materials can be cross-linked to produce dyeable films in metal articles by including in the coating composition an amine cross-linking agent. Also, the acrylic resins containing amine resins or epoxy resins with amine curing agents form films on metal article suitable for dyeing.

As used herein, the term "epoxy resins" is intended to include resins containing one or more epoxide groups. Typical and representative of those epoxy resins containing one or more epoxy groups are those resins disclosed in U.S. Pat. No. 3,028,251, No. 3,058,951, No. 3,102,823, No. 3,321,438, No. 3,442,856, No. 3,506,598 and No. 3,758,633. The aforementioned references illustrate the wide variety of epoxy resins which can be used as film-forming materials, as a powder or liquid, suitable for use in the manufacture of the dyeable films of the invention. Among the epoxy resins which have been found to be satisfactory, both as to durability and dye color pick up are those epoxides made by the reaction of epichlorohydrin (1-chloro-2,3-epoxy-propane) and polyols or hydroxyl containing compounds such as 2,2'-bis(p-hydroxyphenyl)propane (bis-phenol A); phenol-formaldehyde, novalac resins, resorcinal, glycerol and the like.

Curing agents are included in the epoxy resin compositions or must be mixed therewith to either promote homopolymerization or form a cpolymer therewith. Heating may be required to cure the epoxy resin or the reaction may occur at room temperature. Conveniently the curing agent has proton acceptor groups to contribute the basic radicals in the cured film. A large number of curing agents are described in the prior art as exemplified in U.S. Pat. No. 3,028,251, No. 3,058,951, No. 3,321,438, No. 3,442,856, No. 3,506,598, No. 3,102,823 and No. 3,758,633. Suitable agents are found in the quaternizeable derivatives of ammonia such as the amines including the mono-, di-, and poly-primary, secondary and tertiary amines which can be aliphatic, cycloaliphatic, or aromatic in nature.

In powder epoxy resin compositions the curing agents are generally included in the compositions and require heating to cure the resin. Such heat-activated curing agents are mixed with the epoxide in any suitable manner, i.e., a solid curing agent powder mixed with a solid epoxide powder, or the curing agent may be incorporated with the epoxide in a partially reacted solid epoxy resin commonly referred to as B-stage resin. One commonly employed solid curing agent is dicyandiamide which also contributes the necessary proton acceptor groups.

Additionally the polymer resin material may contain other ingredients, such as heat-activated catalysts, pigments, fillers and the like. Where the color (particularly the lighter colors) of a polymer film on a metal element is to closely match a garment when dyed together with the garment, a white pigment, such as titanium dioxide is included in the polymer resin.

A wide variety of dyes in various classes of dyes have been found to produce colors with excellent intensity and uniformity in the polymer film 18. Examples of dyes classified as acid dyes in the Colour Index, Third Edition, 1973, by The Society of Dyers and Colourists, Great Britain, and the American Association of Textile Chemists and Colorists, U.S.A., and which have been found suitable include: Colour Index No. 15510 Acid Orange 7; Colour Index No. 18950 Acid Yellow 40; Colour Index No. 17025 Acid Violet 1; and Colour Index No. 42655 Acid Blue 90. Particular disperse dyes which have been found suitable include FORON Brilliant Yellow SE-6GFL from Sandoz Inc., Hanover, New Jersey, U.S.A., classified as Colour Index Disperse Yellow 49; FORON Red E-G from Sandoz Inc. classified as Colour Index Disperse Red 65; RESOLIN Yellow 7 GL from Bayer Aktiengesellschaft, Leverkusen, Germany, classified as Colour Index Disperse Yellow 73; and RESOLIN Blue FBLD from Bayer classified as Colour Index Disperse Blue 71. Additional suitable dyes include FORON Brilliant Blue E-GFLN from Sandoz; RESOLIN Scarlet PGG from Bayer; and DURONYL Yellow G from Ciba-Geigy Corporation, Andsley, New York, U.S.A. classified as Colour Index Acid Orange 1. Dyes sold in the United States under the Trademark RIT have also been found to produce acceptable color in the polymer coatings. Anionic dyes such as acid dyes and direct dyes in aqueous solutions are believed to be fixed by salt formation with the cationic sites produced by the proton acceptor groups in the polymer film. Other types of dyes, such as disperse dyes, azoic dyes and mordant dyes are believed to be at least aided by the presence of the proton acceptor groups in penetration or reaction to become fixed in the polymer film.

In powder coatings, it has been found that it is necessary to limit the temperature used during heating the the coating 20 of powdered polymer resin to form the film 18. If the temperature is allowed to exceed a predetermined temperature, substantially all the proton acceptor groups undergo irreversible transformation, either by decomposition, becoming buried in the polymer film structure, reaction such as cross-linking, or the like, and the dyeability of the polymer film is substantially impaired. This predetermined temperature is generally substantially less than the temperature at which the polymer is degraded in strength, i.e. the temperature at which depolymerization or oxidation can occur. However, the temperature must be allowed to exceed the melting point of the powdered solid polymer resin to allow the powder to coalesce into a coherent film. The duration of the heating should also be limited to less than a predetermined duration since substantially complete transformation of the proton acceptor groups in polymer resins can occur at lower elevated temperatures over extended periods of time. Transformation of at least some of the proton acceptor groups in certain polymer resins, such as the epoxy resins, may be necessary to allow cross-linking reaction during the heating cycle; but the heating must be stopped short of substantially complete transformation to allow a sufficient quantity of the proton acceptor groups to remain untransformed or active. For epoxy resins with quaternizable derivatives of ammonia or amine curing agents, nylons, and copolymers with amine materials, the temperature is maintained generally below about 205° C. (400° F.) and preferrably should not exceed about 191° C. (375° F.); and heating at a temperature approaching 191° C. should be limited to about 25 minutes, longer time periods being acceptable for lower temperatures, and higher temperatures acceptable only for shorter periods.

The employment of smaller particles of powdered polymer resin aids in the color pick-up from dye solutions; this is particularly noticeable with resins such as nylon-11 and nylon-12 which are formed somewhat deficient in active proton acceptor groups. The milling of the polymer resin to produce the finely divided particles is belived to produce a change in chemical structure of the polymer which results in more active proton acceptor groups being available. Generally, powders having an average particle size less than about 200 microns and preferrably less than about 150 microns produce superior results. The small particle size has another advantage in producing films on small articles such as sliders in that thinner dyeable films are possible using smaller particle powders, the thinner films interferring less with slider operation in slide fasteners than the thicker films produced by prior art coatings. For sliders, the coating should have a thickness generally in the range of about 12 to 153 microns (0.5 to 6 mils) and preferrably in the range of about 22 to 127 microns (0.9 to 5 mils).

Preferrably the powder coating 20 on the metal element 12 is applied by an electrostatic spray process although other powder applying processes may be employed. Films formed from electrostatic powder sprays are generally superior in being more even, and thinner than films formed by other processes. The solid powders are preferrably melted and/or reacted in an oven to form the films but other heating techniques may be used with good results.

One particular advantage of having sliders formed with a dyeable coating is that a garment, such as a dress, of one color could be dyed to a new color and the metal slider will be dyed to the new color along with the rest of the garment.

The adherence and durability of the coating 18 is improved by first treating the metal article 12 with a conventional treatment used to form suitable base surfaces for conventional painting processes and the like; prior to treating, it may be necessary or desirable to initially clean and degrease the metal articles. Typical treatment processes for articles made from alloys which are principally zinc or aluminum include dipping the article in a chromating solution, such as (1) a concentrated sodium dichromate solution which is slightly acidifyied with sulfuric acid, (2) a chromic acid solution containing one or more mineral acids (i.e., sulfuric acid, nitric acid, etc) and a low molecular weight organic acid (i.e. formic acid, acetic acid, etc), or (3) any of the several commercial chromating solutions which are acceptable for treating zinc or aluminum. Where the article is a ferrous alloy, the article can be subjected to a phosphoric treating process. Typical phosphoric treating processes include treating with (a) solutions containing phosphoric acid, stabilizers such as dihydrogen phosphate and accelerating agents such as copper salts, nitrates, etc., (2) phosphoric acid solutions containing phosphates of iron, manganese, and zinc, and (3) any of several commercially available phosphoric treating solutions suitable for treating ferrous metals. It is generally believed that the chromate and phosphoric treating processes produce complexes at the metal surfaces which improve the bonding of many materials.

In nylon coated articles it has been found that improved dye pick-up is achieved in nylon coatings on metal articles if the nylon coatings are subjected to a benzyl alcohol treatment prior to dyeing. The benzyl alcohol treatment is readily accomplished by dipping the coated parts into benzyl alcohol heated to a temperature in the range of from 71° C. (160° F.) to 88° C.

(190° F.). At a temperature of 71° C. a treatment time of two hours is required for improved dye pick-up while at temperatures of 88° C. only forty-five minutes is required. For optimum results a benzyl alcohol treatment of the coated metal article at a temperature of 88° C. (190° F.) for a period of one hour is recommended.

Nylon films, particularly clear films of nylon-11 and nylon-12, formed by powder deposition processes on metal members ae somewhat deficient in dye pick-up compared to dye pick-up by the nylons commonly used in textile materials. The benzyl alcohol treatment has been found to improve the dye pick-up in nylon films on sliders such that the nylon coated metal sliders closely match the dye pick-up in common nylon textiles. The reason that benzyl alcohol renders the nylon film more dyeable is not understood; it could be a reaction rendering the film surface more penetrable by the dye solution or rendering the proton acceptor groups more active.

A modified coated article or slider, illustrated in FIGS. 5, 6, 7 and 8, includes a primer or base layer of film 30, such as a phenol aldehyde polymer layer or a polyester layer, on the metal article 12 under the dyeable polymer film 18. Phenol aldehyde layers are generally formed by dipping in a liquid solution of a phenol aldehyde resin, spinning to remove excess solution and then heating to evaporate the solvent and cure or polymerize the phenol aldehyde resin. Polyester layers are formed by a powder deposition process similar to the process for forming the layer 18 in FIG. 4; such polyester however need not necessarily be dyeable. Suitable polyesters include the polyethylene terephthalates with a curing agent such as isophorone isocyanide.

Phenol aldehyde primer layers are formed as thin as possible while still completely covering the article 12. Generally films of phenol aldehyde less than about 13 microns (0.5 mils) thick and preferrably about 2.5 to 5 microns (0.1 to 0.2 mils) thick will cover the article sufficiently to provide a good base for the polymer film 18.

Polyester primer layers formed from powder deposition techniques are thicker than the phenol aldehyde layers, and should generally have a thickness within the range from 12 to 127 microns (0.5 to 5 mils) and preferrably in the range from 20 to 39 (0.9 to 1.5 mils).

Both phenol aldehyde and polyester primer layers improve the adherence and durability of the dyeable polymer film 18 and impart improved resistivity against a tendency for the polymer film 18 to blister and become loosened from the article 12 when subjected to an acidic dye solution. Cross-linking type polymer resins, such as epoxy resins, in the film 18 may be improved in toughness and durability by grafting or cross-linking across the interface between the layer 30 and the film 18 to render the polymer film 18 more adherent and thus less likely to chip or crack during subsequent processing and handling.

A further modified dyeable article or slider for a slide fastener, illustrated in FIG. 9, includes a white pigmented polymer underlayer or film 31 on the metal member with a clear dyeable polymer layer or film 32, similar to film 18 in FIGS. 4, 7 and 8 on top of the white underlayer 31. The layers 31 and 32 are preferrably formed in a manner similar to the layer 18 such as by an electrostatical spraying and heating process. For sliders, the layers 31 and 32, in FIG. 9, each should have a thickness generally greater than about 2.5 microns (1 mil) to produce coherent films covering the metal member, and generally less than about 127 microns (5 mils)

to avoid interference with slider operation. Preferrably each of the layers 31 and 32 is at least 38 microns (1.5 mils) in thickness.

Clear dyeable polymer layers particularly clear nylon layers with an underlying white layer have been found to pick-up dark colors, such as the blacks, to closely match the color picked-up by nylon textiles. Dyeing dark colors in white pigmented layers is deficient due to a lightening of color by white pigment.

EXAMPLE 1

A batch of metal sliders for slide fasteners are coated by an electrostatic spray with epoxy resin powder N. 89-910 from Pratt and Lambert, Inc., Buffalo, New York, U.S.A. The epoxy resin powder No. 89-910 has an average particle size less than 200 microns and includes an epoxide formed from epichlorohydrin and Bis-phenol A and having a epoxy equivalent weight from 740–800, dicyandiamide as a curing agent, an accelerator, and a titanium dioxide pigment. The quantity of dicyandiamide is stoichmetrically more than 1.1 times the quantity of epoxide. Then the sliders are placed in a convection type oven having a temperature of about 182° C. (360° F.) for a period of about 25 minutes to form a polymerized film of approximately 51 microns (2 mils) on the external surfaces of the slider. The sliders are then assembled on slide fastener tapes made of nylon 6,6. Different groups of the assembled slide fasteners are subjected to the following dye solutions, respectively, in conventional dye processes: (a) ORCO Acid Orange from Ciba-Geigy (Colour Index No. 15510), (b) DUPONT Milling Yellow (Colour Index No. 18950), (c) ORCO Acid Violet from Ciba-Geigy (Colour Index No. 17025), (d) DURONYL Yellow G from Ciba-Geigy (e) RESOLIN Blue FBLD from Bayer, (f) RESOLIN Scarlet PGG from Bayer, and (g) Acid Blue 90 (Colour Index No. 42655). The dye pick-up is generally good in the slide fasteners and the colors of the coatings on the sliders are generally excellent in compatability to the fastener tapes.

EXAMPLE 2

A batch of metal sliders are spray coated and heated to form polymerized films thereon using the techniques and materials of Example 1. The sliders are then assembled on slide fastener tapes made of type 54 W polyester from DuPont, E. I. de Nemours and Co, Wilmington, Delaware, U.S.A. Different groups of the assembled slide fasteners are subjected to the following dye solutions, respectively, in conventional dye processes: (a) RESOLIN Yellow 7 GL from Bayer, (b) FORON Brilliant Blue E-GFLN from Sandoz, (c) FORON Rubine S-2 BGL from Sandoz, and (d) FORON Red E-G from Sandoz. The dye pick-up in the polymer film on the sliders is generally fair to very good and the color compatability between the sliders and the fastener tapes is good to excellent.

EXAMPLE 3

A batch of metal sliders for slide fasteners are coated by an electrostatic spray with a white nylon-11 powder which was formed by milling white nylon-11 to a particle size ranging from 18 to 150 microns. The sliders are placed within a convection type oven having a temperature of about 191° C. (375° F.) for about 10 minutes to form a polymerized film of approximately 76 microns (3 mils) on the external surfaces of the sliders. Different groups of the sliders are dyed utilizing the same dyes and dyeing techniques of Example 1. Dye pick-up in the nylon-11 coatings was generally fair.

EXAMPLE 4

A batch of zinc bodied sliders is treated by immersing in DUCHROME 115 P from DuTone Chemicals Co., Inc. Waukegan, Illinois, U.S.A. for about 60 seconds. DUCHROME 115 P is a chromating solution. Different portions of the treated batch of sliders are then coated with polymer films and dyed used the materials and techniques of Examples 1, 2 and 3, respectively. The colored coatings have improved adherence to the sliders when subjected to tumbling as compared to the respective coatings in Examples 1, 2 and 3.

EXAMPLE 5

A batch of zinc bodied sliders is treated with a chromating solution in a manner similar to Example 4. The treated batch of sliders is dipped into phenolic lacquer No. 4068 from Pratt and Lambert, Inc.; phenolic lacquer No. 4068 is a butyl Cellosolve solution of a material formed from a phenol formaldehyde reaction. The sliders are spun at a high speed to remove excess lacquer and are placed within an oven and heated at about 142° C. (287° F.) for about $3\frac{1}{2}$ minutes to form a base coating of about 3 microns. Different portions of the batch of sliders with the base coatings are then coated with polymer films and dyed using materials and techniques of Examples 1, 2 and 3, respectively. The coatings have substantially less tendency to blister and peel off during the dyeing processes than the respective coatings in Examples 1, 2, 3 and 4. Also the coatings have improved adherence, when subjected to tumbling and the like, over the coatings in the Examples 1, 2, 3 and 4.

EXAMPLE 6

A batch of metal sliders for slide fasteners are coated by an electrostatic spray of a polyethylene terephthalate polyester dry resin powder paint No. 3081-125 from Pratt and Lambert, Inc., Buffalo, New York, U.S.A. The polyethylene terephthalate polyester resin powder has a hydroxyl number of 55, an equivalent weight of 1000 and an average particle size of less than 200 microns. The polyethylene terephthalate polyester resin powder also contained a phorone isocyanide as a curing agent and a titanium dioxide pigment. After the coating operation is completed, the sliders are placed in a convection type oven and the powdered film cured at 400° F. for a period of time of about 20 minutes to provide a cured polymer film having an average thickness of about 28 microns (1.1 mils) on the external surfaces of the slider. A film of epoxy resin is then applied on top of the polyester film using the materials and techniques of Example 1. In tests, the sliders with the base polyethylene terephthalate polyester films were found to be extremely resistant against damage, including impact or chipping, which may occur during commercial dye processing.

EXAMPLE 7

A batch of zinc bodied sliders is treated with a chromating solution in a manner similar to Example 4. The batch of sliders are then coated electrostatically with a nylon-11 powder containing a white pigment. The white powder coated sliders are heated in an oven at a temperature of about 204° C. (400° F.) for about five minutes to melt the white nylon-11 powder and form a coherent white film having a thickness of about 38 microns (1.5 mils). The white nylon coated sliders are then coated electrostatically with a clear nylon-11 powder containing an anti-oxidant and which is subsequently melted in an oven at a temperature of about 204° C. (400° F.) for about five minutes to form a non-yellowing, free from orange peel smooth clear polymer coating having a thickness of about 51 microns (2 mils) on the white underlayer.

The clear nylon coatings are then treated by immersing the sliders for about one hour in a benzyl alcohol bath which is maintained at a temperature of about 82° C. Subsequently the sliders are assembled on slide fastener tapes of nylon-6,6 and the assembled slide fasteners are, respectively, subjected to various nylon dye solutions including disperse dyes, acid neutral dyes and acid type dyes. The dye pick-up in the polymer coatings on the sliders is very good and closely matches the color of the tapes even for the color black.

It is noted that the nylon-11 coated sliders treated with benzyl alcohol show improved dye pick-up to a considerable extent compared to nylon coated sliders not treated with benzyl alcohol.

Equally good results are obtained using a clear nylon-12 powder for the nylon-11 powder above.

Since many modifications, variations and changes in detail may be made to the presently described articles and processes, it is intended that all matter in the foregoing description and the accompanying drawings be interpreted as illustrative and not in a limiting sense.

What is claimed is:

1. An article of manufacture comprising
- a metal member;
- a dyeable polymer coating on the member;
- said polymer coating including a quantity of active proton acceptor groups at least equal to 0.5 times the quantity of polymer molecules in the polymer coating to provide for dye pick-up in the polymer coating;
- said active proton acceptor groups being subject to irreversible transformation by heating above a predetermined temperature;
- said polymer coating being a coherent polymer film formed from a powdered polymer resin including said active proton acceptor groups and which is heated sufficiently to coalesce the powdered resin and form the coherent polymer film, but heated below the predetermined temperature to maintain a substantial quantity of active proton acceptor groups untransformed; and
- a dye in the polymer coating.

2. An article of manufacture as claimed in claim 1 wherein the metal member is a fastening element.

3. An article as claimed in claim 1 wherein the quantity of active proton acceptor groups is at least equal to 1.0 times the quantity of polymer molecules in the polymer coating.

4. An article as claimed in claim 1 wherein the polymer coating includes a quantity of active proton acceptor groups greater than 1.1 times the quantity of polymer molecules in the polymer coating.

5. An article as claimed in claim 1 wherein the active proton acceptor groups are basic quaternizable derivatives of ammonia and the temperature during heating is maintained below about 205° C.

6. An article as claimed in claim 1 wherein the polymer coating is formed from a polymer resin selected from the group consisting of epoxy resin, nylon resin, polyester copolymer resin, and acrylic copolymer resin.

7. An article as claimed in claim 1 wherein the dyeable polymer coating includes a white pigment.

8. An article of manufacture as claimed in claim 1 including a textile portion, said metal member being attached to the textile portion.

9. An article of manufacture as claimed in claim 8 including a dye in the textille portion.

10. An article of manufacture as claimed in claim 8 wherein the article is a slide fastener, the member is a slider for the slide fastener, and the textile portion includes a pair of textile tapes.

11. An article as claimed in claim 10 including a dye in both the polymer coating on the slider and the tapes.

12. An article as claimed in claim 10 wherein the polymer coating on the slider has an average thickness within the range from 12 to 153 microns.

13. An article as claimed in claim 10 wherein the polymer coating on the slider has an average thickness within the range of 22 to 127 microns.

14. An article as claimed in claim 1 wherein the polymer coating is formed from a powdered polymer resin which has an average particle size less than 200 microns.

15. An article as claimed in claim 14 wherein the polymer coating is formed from a powdered polymer resin which has an average particle size less than 150 microns.

16. An article as claimed in claim 14 wherein the polymer coating is formed from a powdered polymer resin which is deposited on the metal member by an electrostatic powder spray process.

17. An article as claimed in claim 1 including
- a base coating on the metal member beneath the dyeable polymer coating,
- said base coating being formed from a synthetic polymer selected from the group consisting of a polyester resin and a phenolaldehyde resin.

18. An article as claimed in claim 17 wherein the base coating has an average thickness less about 127 microns.

19. An article as claimed in claim 17 wherein the average thickness of the base coating is less than 39 microns.

20. An article as claimed in claim 17 wherein the base coating is formed from a resin containing polyethylene terephthalate.

21. An article as claimed in claim 20 wherein the dyeable polymer coating is formed from a polymer resin selected from the group consisting of epoxy resin, nylon resin, polyester resin, and acrylic resin.

22. An article as claimed in claim 21 wherein the dyeable polymer coating is an epoxy resin with a curing agent which is a basic quaternizable derivative of ammonia.

23. An article as claimed in claim 22 wherein the metal member is a fastening element.

24. An article as claimed in claim 22 wherein the article is a slide fastener, the metal fastening element is a slider for the slide fastener, and there is included
- a pair of textile stringer tapes,
- said dyeable polymer epoxy coating on the slider including a white pigment.

25. An article as claimed in claim 24 including a dye in the tapes.

26. An article as claimed in claim 1 wherein the dyeable polymer coating is nylon which has been treated with benzyl alcohol to increase the dyeability of the polymer coating.

27. An article as claimed in claim 26 wherein the nylon is selected from the group consisting of nylon-11 and nylon-12.

28. An article of manufacture comprising
a metal member,
a first layer of a synthetic polymer including a white pigment on said article,
a second layer of a clear synthetic polymer on said first layer, said clear synthetic polymer layer being dyeable, and
a dark dye in the second layer.

29. An article as claimed in claim 28 including a textile portion, said metal member being attached to the textile portion.

30. An article as claimed in claim 29 including a dye in the textile portion.

31. An article as claimed in claim 28 wherein the second layer has an average thickness greater than 25 microns.

32. An article as claimed in claim 31 wherein the second layer has an average thickness greater than about 38 microns.

33. An article as claimed in claim 28 wherein the second layer is formed from a nylon resin.

34. An article as claimed in claim 33 wherein the second layer is treated with benzyl alcohol to increase the dyeability thereof.

35. An article as claimed in claim 24 wherein the nylon resin is selected from the group consisting of nylon-11 and nylon-12, and wherein the nylon resin has been treated by dipping the coated article in a benzyl alcohol at a temperature from 71° to 88° C. for a period from forty five minutes to two hours.

36. An article as claimed in claim 28 wherein the synthetic polymer in the second coating contains active proton acceptor groups which are subject to irreversible transformation by heating above a predetermined temperature, and
said synthetic polymer in the second layer is formed from a powdered polymer resin which is heated sufficiently to coalesce the powdered polymer resin and form a coherent film but heated below the predetermined temperature to maintain a substantial quantity of active proton acceptor groups untransformed.

37. An article as claimed in claim 36 wherein the synthetic polymer coating of the second layer is formed from a powdered polymer resin which has an average particle size less than 200 microns.

38. An article as claimed in claim 29 wherein
the article is a slide fastener,
the metal member is a slider for the slide fastener,
the textile portion includes a pair of textile tapes for the slide fastener,
the first layer has a thickness within the range of 25 to 127 microns, and
the second layer has a thickness within the range from about 25 to 127 microns.

39. An article as claimed in claim 38 wherein the thickness of the second layer is greater than 38 microns.

40. An article as claimed in claim 38 wherein
both the first and second layers are formed from a powdered polymer resin selected from the group consisting of nylon-11 and nylon-12 which have been heated at a temperature below about 205° C. to form a polymer film, and
the slider with the first and second layers has been dipped in benzyl alcohol at a temperature in the range of 71° to 88° C. for a period of forty five minutes to two hours.

41. An article as claimed in claim 40 including a dye in the textile tapes.

* * * * *